UNITED STATES PATENT OFFICE.

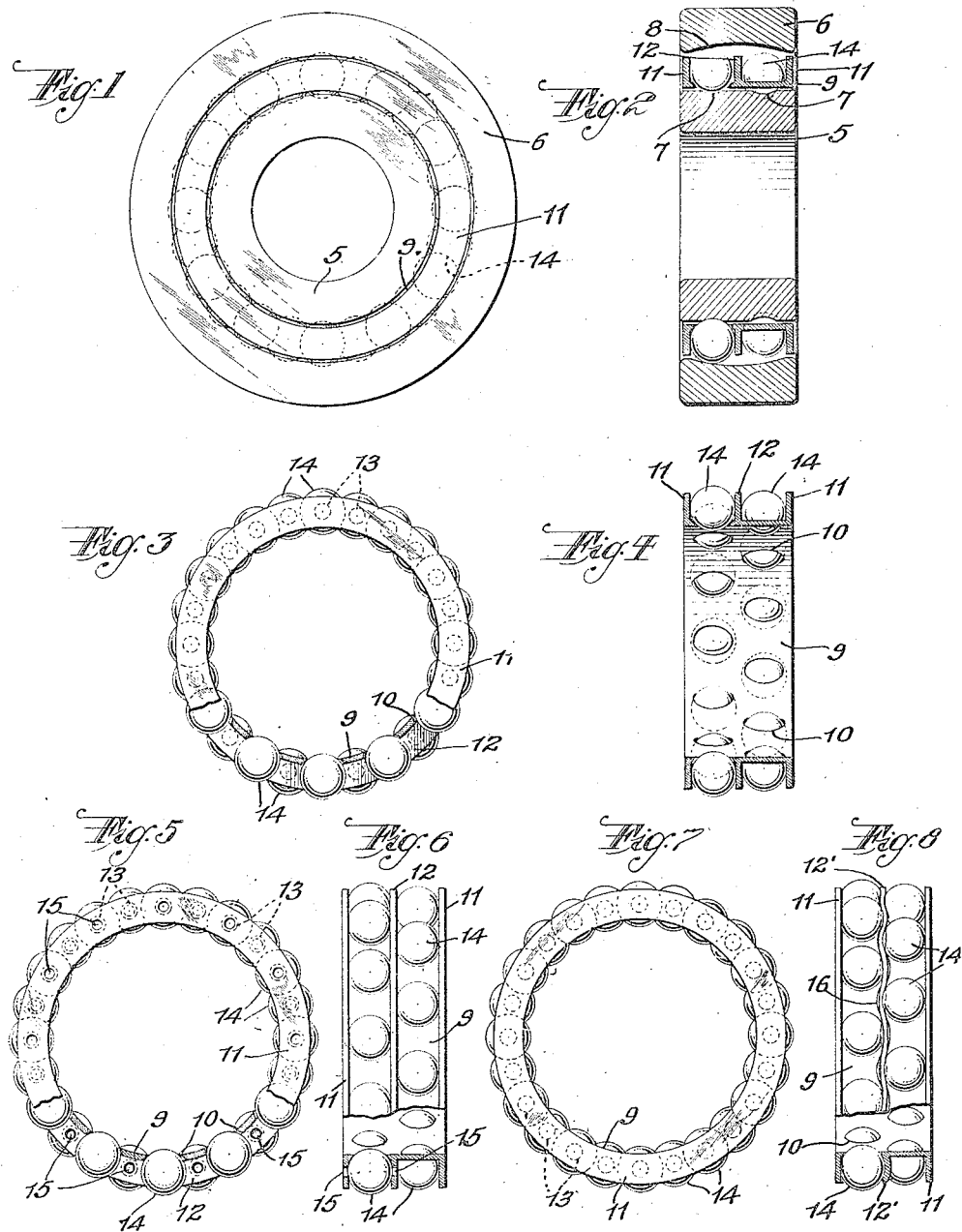

FREDERICK E. MUELLER, OF MOUNT VERNON, NEW YORK, ASSIGNOR TO THE NORMA COMPANY OF AMERICA, OF LONG ISLAND CITY, NEW YORK, A CORPORATION OF NEW YORK.

RETAINING CAGE FOR MULTIPLE-ROW BALL BEARINGS.

1,427,225.     Specification of Letters Patent.     Patented Aug. 29, 1922.

Application filed May 28, 1921. Serial No. 473,376.

*To all whom it may concern:*

Be it known that I, FREDERICK E. MUELLER, a citizen of the United States, and a resident of Mount Vernon, county of Westchester, and State of New York, have invented certain new and useful Improvements in Retaining Cages for Multiple-Row Ball Bearings, of which the following is a specification.
This invention relates to a retaining cage for multiple row ball bearings.

In its generic aspect, the present invention comprehends the provision of a retaining cage for double row ball bearings which is of light, simple and durable construction and will at all times accurately hold the two rows of balls upon the inner race ring against possible displacement, irrespective of the angular relation which the outer race ring may assume with relation to the normal axis of rotation.

An examination of the prior art discloses that various attempts have been made to provide a practical, efficient and serviceable retainer for double row ball bearings of the open or closed radial type. Such prior art devices have been more or less unsatisfactory. In general, they have consisted of one or more parts generally of sheet metal having a multiplicity of ears, tongues or other holding projections of peculiar form or shape entailing a plurality of operations requiring great skill and exactness so that the manufacture of such devices is difficult, time-consuming, and comparatively expensive. Moreover, in practice, a great deal of difficulty has been experienced owing to the fact that the ears, tongues or other holding projections not only weaken the cage structure as a whole, but also become bent or displaced from their normal positions, thereby removing the holding or restricting action on the balls and permitting of their relative circumferential movement and rearrangement in the cage. In other words, such retaining cages quickly lose their practical efficiency and the retaining function upon the balls is destroyed. This, of course, results in looseness and a very noticeable and objectionable noise and eventual destruction.

It is, therefore, the particular object and purpose of my present improvement to provide a retaining cage for bearings of the above type, possessing as a characteristic inherent in the cage structure, the property of effecting an equalized circumferential distribution of such strains as may devolve upon the cage, to thereby nullify the tendency of localized distortion, a practical consideration which seriously impairs the efficient operation of retainers in the particulars above referred to.

In one embodiment of my invention I provide an annular cage body having a plurality of laterally spaced circumferentially continuous, relatively yieldable ball retaining flanges, the said flanges being each provided with spaced ball receiving depressions to yieldably retain the balls for independent rotation about an axis. In another construction, I provide the retaining flanges of the cage at the center of each ball receiving depression with a small aperture thereby affording a definite annular area of contact of the ball with the retaining flange and also facilitating the distribution of a suitable lubricant between the balls and the parts of the cage. In still another construction, the separating retainer flange between adjacent rows of balls may be of a fluted or wavy form, the said flange being thus formed by a pressing operation on the outer flanges of the cage with the balls properly arranged in the spaces between said flanges and the separating flange. The latter flange will thus be bent or alternately projected upon opposite sides of its normal plane by the peripheral surfaces of the balls.

With the above and other objects in view, the invention consists in the improved retaining cage for multiple row ball bearings as will be hereinafter more fully described, illustrated in the accompanying drawings and subsequently incorporated in the subjoined claims.

In the drawings wherein similar reference characters designate corresponding parts throughout the several views, Figure 1 is a side elevation showing an assembled bearing equipped with one embodiment of the present invention;

Figure 2 is a diametrical section through the inner and outer race rings and the ball retaining cage;

Figure 3 is a side elevation of the retaining ring with the balls assembled therein, one of the side flanges of the ring being partly broken away;

Figure 4 is a diametrical section through the retaining cage removed from the bearing, Figure 5 is a view similar to Figure 3 showing a slightly modified form of the invention, Figure 6 is an edge view parallel in section to the construction shown in Figure 5, and Figures 7 and 8 are side elevations and edge views similar to Figures 5 and 6 illustrating still another embodiment of the invention.

In the accompanying drawings, Figures 1 and 2 illustrate a typical open type of ball bearing wherein there is provided two rows of balls with the balls arranged in staggered relation. As herein shown, the inner ring 5 and the outer ring 6 of the bearing are of such relative diameters as to permit the assembled bearing unit consisting of the cage and the two rows of balls, to be presently further referred to, to be interposed therebetween. The inner bearing ring 5 is provided in its outer peripheral face with the laterally spaced annular races 7 for the reception of the respective series of balls. The outer ring 6 is provided with a single race 8 which extends in one continuous arc substantially entirely across the inner face of said ring. The rows of balls bear upon this spherical race 8 at relatively opposite sides of the central median plane of the ring. Obviously, by the provision of the spherical outer race 8 and the two rows of balls arranged as just explained, the direct line of load pressure with relation to the two series of balls, is in each instance perpendicular to the outer race through the balls to the axial center of the bearing. It is further apparent that the outer bearing ring and the inner bearing ring are free to assume various oblique or angular positions with relation to each other and with respect to the normal axis of rotation. By reason of the improved ball retaining cage, hereafter described in detail, the two series of balls retained therein are securely held in position in the races 7 of the inner bearing ring 5, irrespective of the angular position which the outer ring 6 may assume.

Referring now more particularly to Figures 3 and 4 of the drawing, the retaining cage as therein shown includes an annular body portion 9 having two annular series of circular openings 10 therein disposed in staggered relation to each other and of less diameter than the maximum diameter of the balls. This body wall 9 of the cage is provided with outwardly projecting continuous side flanges 11 and an intermediate flange 12 which is likewise continuous. These flanges are all of equal width and while I have illustrated the cage with but three flanges to provide two annular channels for the reception of two rows of balls, it is manifest that such flanges might be multiplied if for any reason, a greater number of rows of balls is desired. For convenience in illustration, I have shown the retaining cage as consisting of a one-piece integral structure, but it is obvious that this cage might be formed in two or more parts.

The side flanges 11 are provided in their inner faces and the intermediate flange 12 in each of its side faces with spaced ball receiving depressions 13. Insofar as the present disclosure is concerned, it is not material how these depressions in the flanges are produced. They may be conveniently formed in a single operation by means of a depression-producing machine, or they may be produced in a series of operations. It will suffice to state that the depressions 13 of one flange 11 and in one side of the flange 12 are disposed in alignment with each other and intermediate of the ball receiving depressions in the opposite side of the flange 12 and in the other of the flanges 11. Thus when the two series of balls 14 are positioned between the spaced flanges so that they protrude through the openings 10 in the body wall of the retaining cage the said balls are disposed in staggered relation to each other. The flanges 11 and 12 exert a yielding holding pressure upon the balls and have a single point of contact therewith at the centers of the impressions 13, thereby holding the individual balls for rotation about an imaginary axis. It will be observed from reference to Figure 4 of the drawing that the ball receiving depressions 13 are so located as to afford a minimum of clearance between the periphery of the ball and the cage parts. In this manner a very compact arrangement in a cage of minimum size is obtained with the elimination of frictional resistance to the free rotation of the balls.

The two annular series or rows of balls are assembled in the retaining cage as shown in Figure 3 and the completed unit thus arranged in operative position between the inner and outer bearing members. While the flanges 11 and 12 of the retaining cage have a yielding gripping pressure on the balls, as these flanges are circumferentially continuous and a part of the annular cage body, they are not easily distorted or bent to an abnormal position which might result in the application of undue frictional resistance to the free rotation of the balls. Such strains or stresses as may devolve upon the cage structure are distributed circumferentially of the retaining flanges, and between the several flanges thereof confining the ball rows, through the medium of the interposed balls. Thus localized distortion of the retaining flanges is obviated so that the individual balls while they are held or retained in the cage for unretarded free rotation cannot shift circumferentially in the cage channels or on the other hand, be so tightly gripped or held as to impair their proper functioning. Insofar as I am aware, the provision of a continuous annular separating flange between the ball rows in a cage structure applicable with the balls as a unit to its operative position in the bearing, is new in the art.

In Figures 5 and 6 of the drawing, I have shown a slightly different form of the invention wherein the cage is constructed in the same manner as above described but in which the ball retaining flanges are provided with small apertures 15 in concentric relation with the ball impressions in said flanges. These holes or apertures in addition to aiding in the formation of the ball depressions also greatly facilitate proper lubrication between the balls and the parts of the cage. It will be observed that the ball depressions 13 are not eliminated by the provision of the apertures 15 but there remains an annular portion of the depression surrounding each aperture which provides a definite area of contact with the ball instead of a possible single point contact as in the construction shown in Figures 3 and 4.

In Figures 7 and 8 of the drawings, I have shown another alternative construction wherein the intermediate retaining flange 12' of the cage is of wavy or fluted form. The outer side flanges, however, remain of straight or flat form, perpendicular throughout their extent to the axis of the cage. The bends or flutes 16 of the intermediate flange 12' extend alternately upon opposite sides of the normal perpendicular plane of said flange and in practice are preferably produced by inserting both rows of balls in the cage channels with said balls arranged in staggered relation to each other and then in a single pressing operation, the depressions are formed in the inner faces of the side flanges and the intermediate flange is fluted as shown. It will be obvious that when the press closes on the cage with the balls therein, the side flanges are uniformly pressed or forced against the balls while the intermediate flange, owing to the staggered relation of the balls, is bent alternately in opposite directions so that it takes on the wavy or fluted form as illustrated in Figure 8.

From the foregoing description considered in connection with the accompanying drawing, the construction and several advantages of the described embodiments of the invention will be readily understood. To summarize, it will be appreciated that by reason of the construction herein disclosed, I have succeeded in producing a retaining cage for double row ball bearings which, though very light in weight is not subject to destructive distortion under strain or stress. The balls are at all times properly held in their relative positions with the greatest freedom of independent rotation in the bearing race ways while at the same time the retainer will be supported by the balls and looseness thereof resulting in noisy rattling by contact of the cage with the bearing members entirely obviated.

While I have herein shown and described several satisfactory and practical embodiments of the present invention, it is nevertheless to be understood that the improved retaining cage might also be produced in other alternative structures and I, accordingly, reserve the priviledge of adopting all such legitimate changes as may be fairly embodied within the spirit and scope of the invention as claimed.

I claim:

1. A retaining cage for multiple row ball bearings, comprising an annular cage body having a plurality of laterally spaced, circumferentially continuous, relatively yieldable ball retaining flanges each provided with spaced ball receiving depressions to receive and yieldingly hold the assembled series of balls in the retaining cage for free relative rotation about axes extending in variable angular directions with respect to the axis of the bearing.

2. A retaining cage for multiple row ball bearings, comprising an annular cage body having a plurality of laterally spaced circumferentially continuous, relatively yieldable ball retaining flanges, one of said flanges being common to adjacent rows of balls and separating said ball rows from each other, each flange being provided in its ball engaging face with spaced ball receiving depressions to receive and yieldingly hold the assembled series of balls in the retaining cage for free relative rotation about axes extending in variable angular directions with respect to the axis of the bearing.

3. A retaining cage for double row ball bearings comprising an annular cage body having circumferentially continuous side flanges and an intermediate circumferentially continuous flange constituting a separator between the ball rows, said flanges being relatively yieldable with respect to the cage body and each having a series of ball receiving depressions to receive and yieldingly hold the balls in circumferentially spaced relation between said flanges for free relative rotation.

4. A retaining cage for double row ball bearings, comprising an annular cage body having circumferentially continuous side flanges and a circumferential continuous intermediate flange constituting a separator between the ball rows, said flanges being relatively yieldable with respect to the cage body and each having means for yieldably retaining the balls between said flanges and preventing their relative circumferential movement therein while permitting of the free individual rotation of said balls.

5. A retaining cage for double row ball bearings comprising an annular cage body having spaced openings for the protrusion of the balls therethrough and provided with circumferentially continuous side flanges and an intermediate circumferentially continuous flange constituting a separator between the ball rows, said flanges being unconnected at their outer edges and relatively yieldable with respect to the cage body, each flange having means coacting with the balls to retain the same between the flanges and prevent their relative circumferential movement while permitting of their free individual rotation.

6. A retaining cage for double row ball bearings comprising an annular cage body having spaced openings for the protrusion of the balls therethrough and provided with circumferentially continuous side flanges and an intermediate circumferentially continuous flange constituting a separator between the ball rows, each of said flanges being provided with spaced ball receiving depressions to yieldably hold the balls against relative circumferential movement while permitting of their free individual rotation and apertures in said flanges of less diameter than the ball receiving depressions and in concentric relation therewith.

In testimony that I claim the foregoing as my invention, and I have signed my name hereunder.

FREDERICK E. MUELLER